June 10, 1930.        J. O'ROURKE        1,763,176
CLAM DIGGER FORK
Filed May 6, 1929
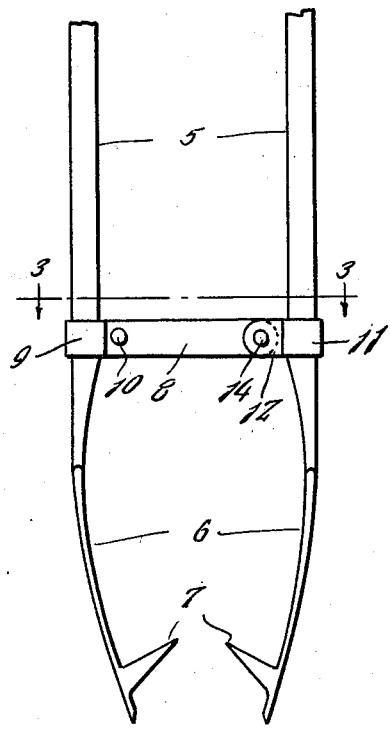
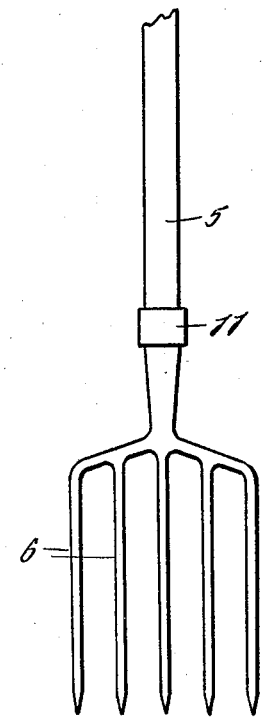
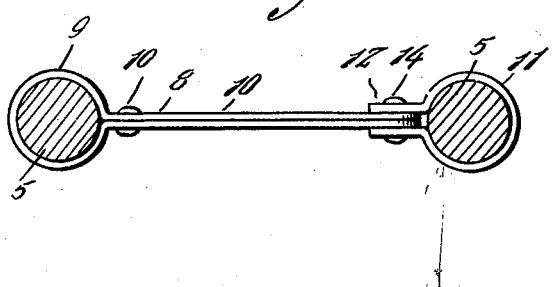
Inventor
John O'Rourke
By Clarence A. O'Brien
Attorney Patented June 10, 1930

1,763,176

UNITED STATES PATENT OFFICE

JOHN O'ROURKE, OF SOUTH BEND, WASHINGTON

CLAM-DIGGER FORK

Application filed May 6, 1929. Serial No. 360,832.

The present invention relates to a clam digger fork and has for its prime object to provide a structure which is simple, easy to handle, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the structure embodying the features of my invention, Figure 2 is a similar view taken at right angles to that shown in Figure 1, and Figure 3 is a sectional view taken substantially on the line 3—3 of Figure 1.

Referring to the drawings in detail it will be seen that numerals 5 denote handles with forks 6 on their lower ends, the tines of which are provided with inwardly directed projections 7.

A spacing strap 8 is bent intermediate its ends to provide a collar 9 clamped about the lower end of one handle 5 by means of rivets 10 and a pair of straight abutting extensions 10'. A collar 11 is clamped about the lower end of the other handle 5 and has a pair of spaced parallel ears 12 straddling the extremities of the straight extensions 10 and pivoted thereto as at 14.

From the above detailed description it will be seen that the bottom part of the device is inserted in the ground and then the handles at the top are pulled apart and thus causing the forks to move toward each other with the clams therebetween so that the said clams may be easily and efficiently lifted.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a pair of handles, forks on the lower ends of the handles, and means for pivotally connecting the handles together in spaced relation.

2. A device of the class described comprising a pair of handles, forks on the lower ends of the handles, a strap having its intermediate portion bent around the lower end of one handle to form a collar engaged therewith and terminating in the straight abutting extension, and a collar clamped around the lower end of the other handle and having gears straddling the extremities of the straight portion, and means impinging the gears thereto.

3. A device of the class described comprising a pair of handles, forks on the lower ends of the handles, a strap having its intermediate portion bent around the lower end of one handle to form a collar engaged therewith and terminating in the straight abutting extension, and a collar clamped around the lower end of the other handle and having gears straddling the extremities of the straight portion, and means impinging the gears thereto, the tines of said fork being formed with inwardly directed projections.

4. A device of the class described comprising a pair of handles, forks on the lower ends of the handles, a spacing strip secured to one handle and means for pivotally connecting the other handle to the strap in spaced relation to the first-mentioned handle.

In testimony whereof I affix my signature.

JOHN O'ROURKE.